United States Patent [19]

Bauer et al.

[11] Patent Number: 5,596,910
[45] Date of Patent: Jan. 28, 1997

[54] STEPLESS LOCKING DEVICE FOR AN ADJUSTABLE SEAT OF A VEHICLE

[75] Inventors: Heinz Bauer; Burckhard Becker; Ernst-Reiner Frohnhaus; Ulrich Karthaus, all of D-Solingen, Germany

[73] Assignee: C. Rob. Hammerstein GmbH, Germany

[21] Appl. No.: 369,168

[22] Filed: Jan. 5, 1995

[30] Foreign Application Priority Data

Jan. 5, 1994 [DE] Germany ............................ 44 00 232.7

[51] Int. Cl.⁶ ............................................. G05G 5/18
[52] U.S. Cl. ........................... 74/526; 74/529; 74/532; 74/533; 74/540; 248/408; 248/429; 297/344.1; 403/108
[58] Field of Search ................................ 74/526, 527, 529, 74/532, 533, 534, 535, 536, 537, 538, 539, 540; 70/261, 209; 248/408, 423, 429, 430; 297/311, 344.1, 344.11; 403/104, 106, 107, 108

[56] References Cited

U.S. PATENT DOCUMENTS 4,712,759  12/1989  Sugama et al. ........................ 248/429
5,234,189   8/1993  Myers ...................................... 248/429

FOREIGN PATENT DOCUMENTS 408932  6/1990  European Pat. Off. .

*Primary Examiner*—Charles A. Marmor
*Assistant Examiner*—Chong H. Kim
*Attorney, Agent, or Firm*—Quarles & Brady

[57] ABSTRACT

The locking device for an adjustable vehicle seat with a snap-in bar extending parallel to an adjustment direction and having locking members and locking gaps arranged periodically. The locking device has a locking unit pertaining to said snap-in bar which is shiftable in the adjustment direction along said snap-in bar. The locking unit has more than two ratchet teeth, which:

- are independently movable in a locking direction extending across the snap-in bar,
- are elastically preloaded in the locking direction,
- can be disengaged simultaneously,
- are arranged one behind the other at equal distance in the adjustment direction,
- are of the same construction,
- each have two lateral flanks designated to be contacted with the lockings, with at least one of the two lateral flanks having a partial area located at the front in locking direction, which extends at an acute angle to the locking direction.

19 Claims, 2 Drawing Sheets

STEPLESS LOCKING DEVICE FOR AN ADJUSTABLE SEAT OF A VEHICLE

BACKGROUND OF THE INVENTION

The invention relates to a locking device for an adjustable vehicle seat, e.g., for a vehicle seat shiftable in longitudinal direction.

In the multi-ratchet locking device previously known from European patent 408 932 locking of at least one ratchet tooth is effected at a partial area of a lateral flank of said ratchet tooth, which extends at an acute angle to the locking direction. This ratchet tooth does not completely snap in during the locking process but comes into contact at various positions along the partial area extending at an acute angle to the locking direction with the appropriate locking.

Depending on the locking condition of the multiple ratchet teeth only a few engage into the locking gaps, sometimes merely two ratchet teeth. Complete locking is achieved by two ratchet teeth. Of these two ratchet teeth one tooth effects blocking in one direction of the adjustment direction while the other tooth, with its opposed flank, effects blocking in the other direction of adjustment. The other ratchet teeth come to lie disengaged on the lockings; they are not required for this particularly adjusted locking process. However, they are necessary for locking engagement at other relative positions between snap-in bar and locking device.

The previously known locking device is particularly suitable for manually operated locking devices of adjustable vehicle seats; for example, for locking the longitudinal adjusting device of a rest joint fitting etc. When performed in practice, operating is effected with an operating device and is effected by means of a bowden rope, for example. When the operating device is drawn and stretched against the force of the springs preloading the individual ratchet teeth in locking direction, a releasing device will lift or draw the ratchet teeth into a release position, i.e., out of engagement with the lockings. The release device is designed as a drag clutch; it initially acts on at least one ratchet tooth protruding farthest in locking direction, lifts it up, subsequently lifts the other ratchet teeth protruding to a lesser extent in locking direction and eventually, takes along those ratchet teeth lying on the lockings.

In practical operation, the operator will experience a graduated operating force. Initially, when only one ratchet tooth or a few ratchet teeth are drawn, the force for release is low. However, the force will increase abruptly when the disengaged ratchet teeth lying on the lockings are likewise lifted and drawn free in the further course of the release motion. During the release motion, the operator will experience a stepwise occurring force.

In specific cases of relative positions between snap-in bar and locking unit, this graduation will be particularly significant when only two ratchet teeth are in engagement and the other ratchet teeth lie on the lockings without engagement. In this case a user, when operating the release device, might misinterpret the level of force that he feels as the disengaged ratchet teeth also come free with proceeding release motion and conclude that this already is the final stop of the release device and thus, as the end of the motion which he has to carry out for release. In this case, however, release is not yet achieved. Even if he does not make this mistake, a graduated operating force in release direction is unfamiliar and misleading for the user.

Now, this is where the invention commences. It has the objective to further advance the known locking device of the type mentioned at the beginning in such way that without changing the practically stepless locking at any relative position whatsoever, more than half of the ratchet teeth will engage in locking gaps if ever possible, so that the number of ratchet teeth lying on the lockings without engagement will be as low as possible, and a user, when operating the release device in the direction of release, will experience a level of force as low as possible when moving the non-engaged ratchet teeth as well into release position subsequently to the engaged ones.

Starting from the locking device mentioned at the beginning, the objective is attained in that for periodic measure P, there is provided a short locking gap, a first locking, a long locking gap, and a second locking corresponding in width to the first locking, with the long locking gap being at least 1.5 times as wide as the short locking gap, and with both lockings together making up for less than 40%, preferably less than 25% of the periodic measure P.

In said locking device, there are provided two different locking gaps in periodic and alternating fashion, namely, a short and a long one. In the selected description of claim 1 the periodic measure P is defined in such way that each period consists of a short and a long locking gap and of two lockings equal in width. The corresponding locking unit with n locking teeth of the same construction arranged at equal distances has an overall width corresponding to the sum of n times b plus (n−1) times z, wherein b is the width of a locking tooth and z is the distance between two locking teeth. The overall width may be smaller and, preferably, is smaller than the measure P; e.g., it is 0.8 times P.

In terms of proportion, the snap-in bar of the locking device according to the invention has more gaps than lockings; the locking gaps together make up for at least 60%, preferably at least 75% of the length of the snap-in bar while the lockings make up for only 25%, preferably 20%. In this way, the probability that one of the ratchet teeth encounters a locking is relatively low. In other words, of n ratchet teeth in the locking device according to the invention, at least $\frac{3}{5}$, preferably at least $\frac{3}{4}$ and, in particular, at least $\frac{4}{5}$ do snap in more or less. In this way, the stage during dragging free of the individual ratchet teeth is determined by disengaged ratchet teeth to merely a minor extent. In particular, when dragging free, it is not the case that multiple ratchet teeth lying on the lockings will come free all of a sudden; rather, the force during dragging free is diversely graduated.

It has proven particularly advantageous to select the distance between two adjacent ratchet teeth in the region of the tooth tips greater than the width of a locking and the distance of two adjacent ratchet teeth in the region above this partial area smaller than the width of a locking. Then, lock is established in that two adjacent ratchet teeth come to lie left and right at a locking. Of these two ratchet teeth one has completely snapped in and thus makes contact above its slanted extending partial area with the locking; the other one has snapped in in such way that lock occurs at the partial area. Independent of tolerances, a precise and slack-free lock is always attained in this way. Each such lock requires only two ratchet teeth. The additional ratchet teeth are not necessary for this specific lock but effect a lock when the locking unit is shifted by a small proportion of the periodic measure with respect to the snap-in bar. In other words, the additional ratchet teeth result in locks at positions which are only slightly away from the lock positions of the ratchet teeth in question. Thus, a highly fine-stepped though not stepless lock is achieved in this way.

It has proven very advantageous to design the short locking gaps in circular shape and to devise the long locking gaps as slots limited by half circular arcs having the radii of the short locking gaps. Then, the ratchet teeth are designed in a round shape and have a radius smaller than the radius of the circular short ratchet teeth; preferably, it is smaller than 70% of this radius, in particular, even smaller than 60%. This locking device can be produced favorably. Due to the differences in diameter, defined contacts are achieved. It is possible to achieve by means of rotation that the ratchet teeth will not wear on one side.

Proven to be particularly advantageous are locking units having four ratchet teeth; here, in the normal case, three ratchet teeth are always locked into the snap-in bar, and merely one ratchet tooth lies on a locking without engagement. The constructive input with four ratchet teeth is still tolerable; however, the locking effect is qualitatively good due to the three ratchet teeth being engaged normally.

At any relative position between locking unit and snap-in bar, the locking device according to the invention will always result in engagement of at least one ratchet tooth in one of the locking gaps. Here, lock is always achieved which also withstands acceleration forces due to accidents. However, such a lock is not always free of slack. Frequently, for a slack-free lock between locking unit and snap-in bar a relative motion between these two parts is required. In case this occurs, another ratchet tooth will engage at least so far until a slack-free lock is reached. Thus, a distinction is to be made between the first step of lock wherein a sufficiently secure connection between locking unit and snap-in bar is always achieved, i.e., independent of the relative position between snap-in bar and locking unit, and a slack-free lock which cannot be achieved at any relative position but, starting from the first step of lock, is achieved with minor relative motions such as regularly occurring due to movements of the passenger or acceleration of the motor vehicle.

THE DRAWING

Further advantages and features of the invention are apparent from the other claims and the now following description of two embodiments which are not to be understood as limiting and which will be explained in more detail with reference to the drawings. Therein, FIG. 1 shows a locking device having a snap-in bar and a locking unit having three ratchet teeth in side view; shown is the disengaged condition;

DETAILED DESCRIPTION OF THE DRAWING

Figure 1:
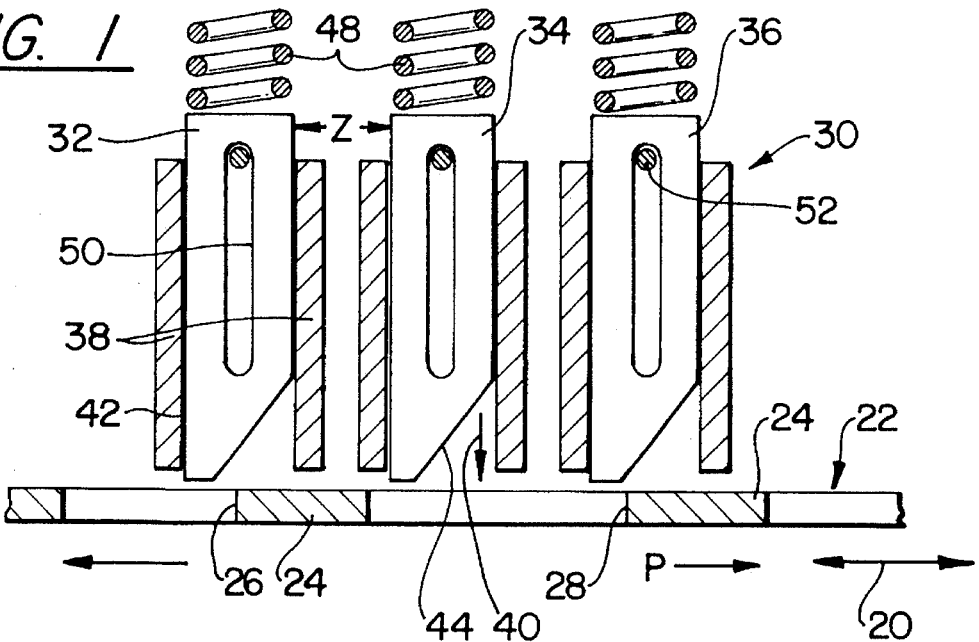

As shown by both embodiments, the locking device has a snap-in bar 22 extending parallel to an adjustment direction 20, which bar has lockings 24, short locking gaps 26 and long locking gaps 28 arranged in a periodic measure P. For each periodic measure, there is provided a short locking gap 26, a first locking 24, a long locking gap 28, and a second locking 24. Both lockings 24 are of the same construction, in particular, they are of the same length (each viewed in adjustment direction 20). The short locking gap 26 is about 66% in length of the long locking gap 28. Each one of the lockings 24 is 80% as long as a short locking gap 26. The periodic measure P is marked.

The snap-in bar 22 is associated to a locking unit 30. In a practical specific case, locking unit 30 and snap-in bar 22 may be shifted relatively to each other in adjustment direction 20. The adjustment direction 20 may be a straight line as in a longitudinal adjusting device; however, it also may take a curved course as, for instance, in a joint adjusting device.

The locking unit 30 has three flat ratchet teeth 32, 34, 36 of same construction. Each of them may be shifted lengthwise in a guide 38 and namely, in a locking direction 40 extending across the adjustment direction 20. Said locking direction 40 may also take a curved course; in the illustrated embodiment according to FIGS. 1 to 3 it extends in a straight line. The guide 38 effects that the ratchet teeth 32, 34, 36 can move only in locking direction 40. The guide 38 projects as close as possible to the snap-in bar 22.

Figure 2:
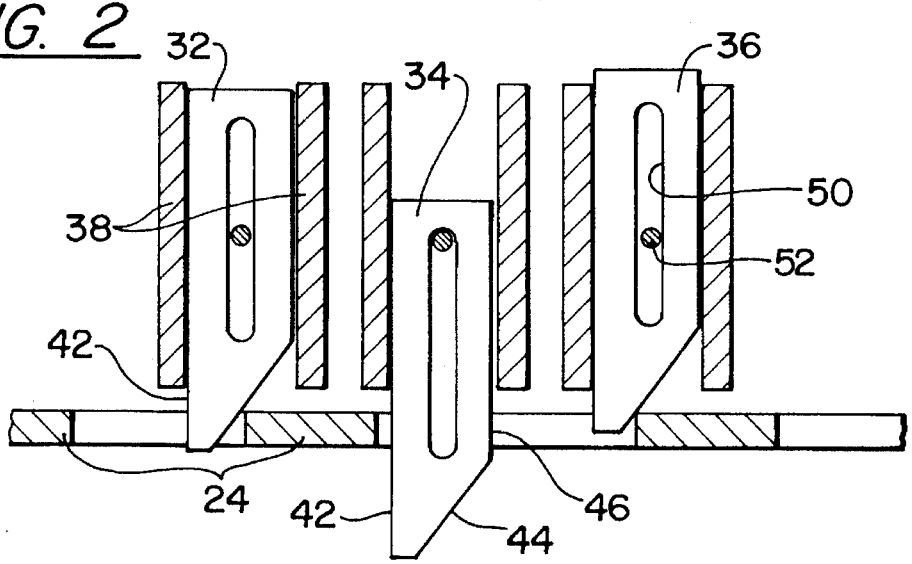
FIG. 2 shows the locking device according to FIG. 1 in the condition immediately following release of the operating device for the locking unit.
Figure 3:
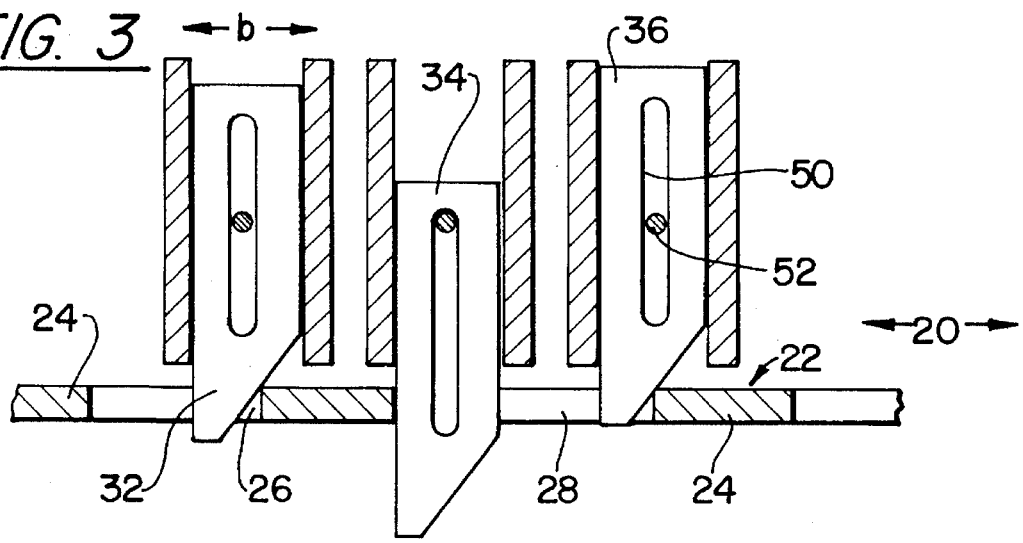
FIG. 3 shows the locking device according to FIG. 1 in the condition of completely locked, slack-free lock.

In the embodiment according to FIGS. 1 to 3 the ratchet teeth on their left side have a flank 42 extending in locking direction 40. Their right flank consists of a slanted extending partial area 44 beginning immediately at the blunt lower free end of the ratchet teeth 32, 34, 36 and an area 46 continuing upwards from there in locking direction 40. The slanted extending partial area 44 extends at an angle which, on the one hand, is selected to be as large as possible but, on the other hand, is small enough that the ratchet tooth during a relative motion between locking unit 30 and snap-in bar 22 due to an accident cannot be pushed out against the locking direction 40 from a locking position by itself. Specifically, this means that both outer ratchet teeth 32, 34, 36 in the illustration of FIGS. 2 and 3 cannot be pushed out from the locking position shown. In the illustration according to FIGS. 1 to 3 the slope of partial area 44 is exaggerated. In practice, this angle is about 10°, for example, about 12° and is dependent of the angle of selflocking between the materials used.

Now, as is apparent from FIG. 1, the ratchet teeth 32, 34, 36 are elastically preloaded in locking direction 40 by a spring 48 pertaining to each of the teeth. The ratchet teeth 32, 34, 36 can be disengaged together; FIG. 1 shows the simultaneous disengagement condition. For disengagement, an operating device is provided which is known per se. FIGS. 1 to 3 only show the essential parts of same. Accordingly, each of the ratchet teeth 32, 34, 36 has a slot 50 extending in locking direction 40, the free length of which is longer than the length of partial area 44 plus the thickness of snap-in bar 22. Into said slot 50 a pin 52 of the operating device engages which, for example, is operated by means of a bowden rope. In FIG. 1 the condition is shown wherein the pins 52 of the operating device hold all three ratchet teeth 32, 34, 36 in the highest position. When the operating device is released, the pins 52 assume their lowest position which is illustrated in FIGS. 2 and 3. In this position they limit the path of each ratchet tooth 32, to 36 in locking direction 40. Thus, in both of the FIGS. 2 and 3, the middle ratchet tooth 34 has had maximum motion in locking direction 40 and cannot be moved further downwards.

When releasing the operating device for locking unit 30, the following motion occurs; The locking unit 30 is at a random position relative to the snap-in bar 22. Starting from the condition according to FIG. 1, the released ratchet teeth 32, 34, 36 move independently; they advance to such extent until either they come to a stop at the lockings 24 or, as is shown for the case of the middle ratchet tooth 34, undergo maximum motion downwards. In this way, the condition according to FIG. 2 is reached. This is a first step of lock; this lock is already completely sufficient for situations caused by an accident but is not yet free of slack. Slack-free lock is achieved only by relative motion in adjustment direction on 20; such a lock is illustrated in FIG. 3. As can be seen by comparison with FIG. 2, the snap-in bar 22 has moved somewhat to the right until the left flank 42 of the middle ratchet tooth 34 has come to a stop at the right edge of the adjacent locking 24. Simultaneously, the two outer ratchet teeth 32, 36 have moved further to the front in locking direction 40. Lock according to FIG. 3 is slack-free for that reason because in one direction of the adjustment direction 20 the left flank 42 of the middle ratchet tooth 34 comes to lie at the described edge of locking 24 and the other adjustment direction is blocked by the partial areas 44 of the two ratchet teeth 32, 36.

Figure 4:
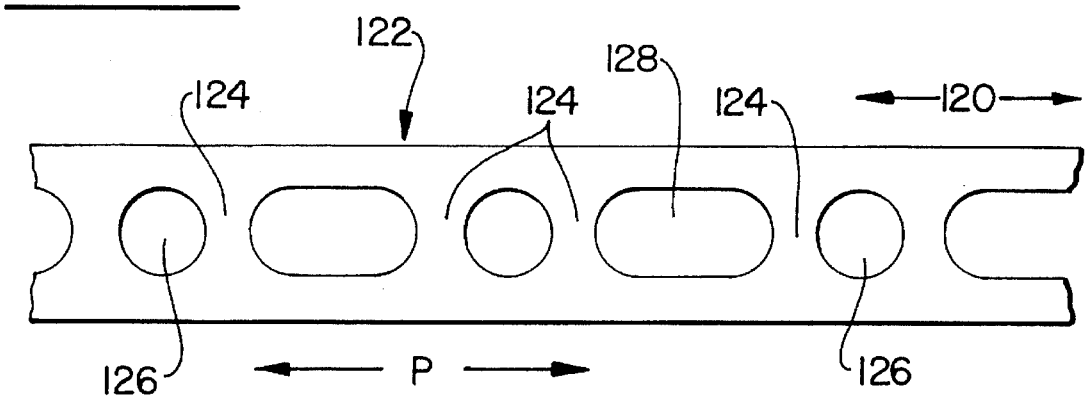
FIG. 4 shows a top view of a snap-in bar for a second embodiment.
Figure 5:
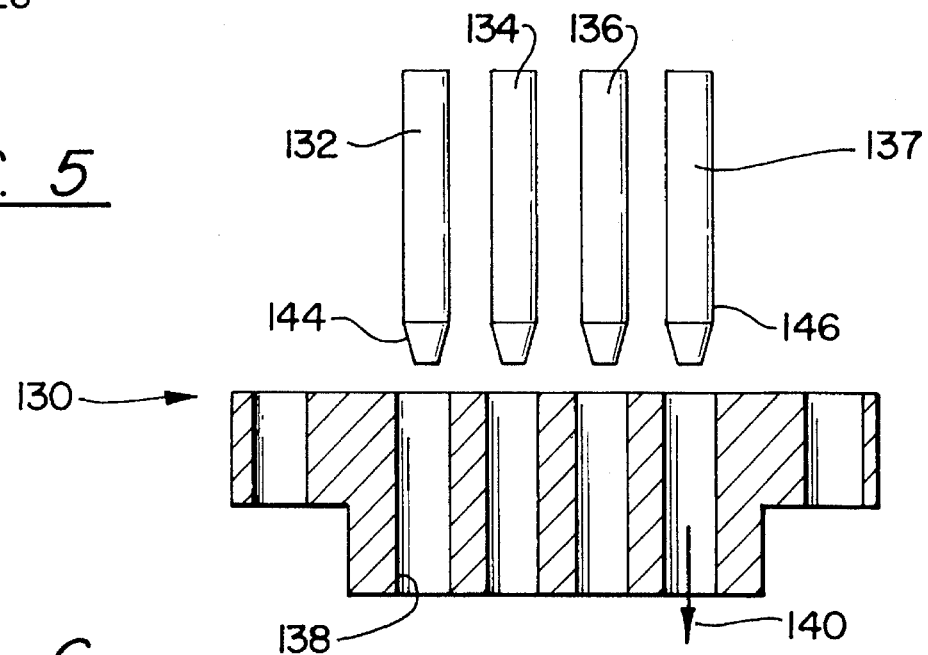
FIG. 5 shows a cross-sectional view of a locking unit in mounting condition with four equidistant ratchet teeth of same the construction and circular cross-section.
Figure 6:
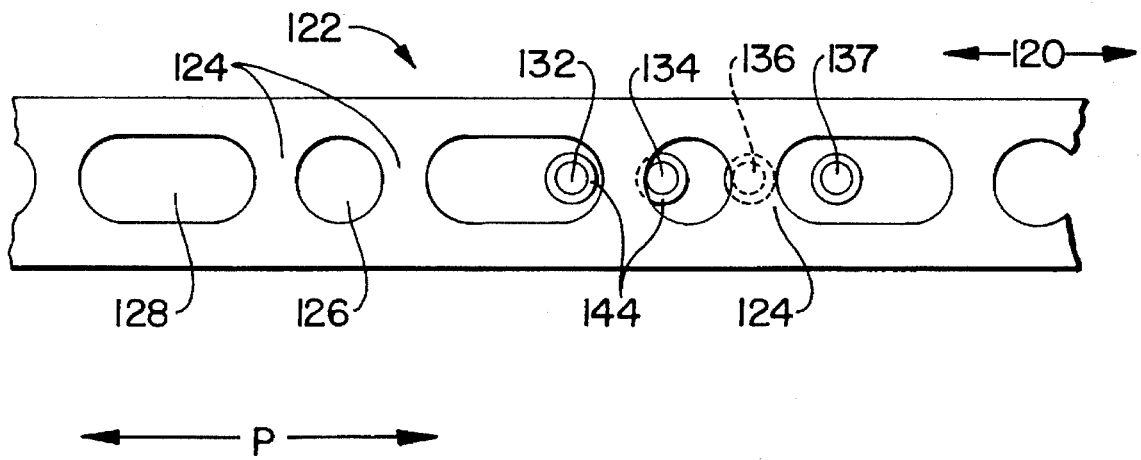
FIG. 6 shows an illustration of the snap-in bar as in FIG. 4 viewed from below, with illustration of the engagement of the four ratchet teeth into the locking unit according to FIG. 5 in a slack-free lock.

In FIGS. 4 to 6 a second embodiment is shown. Both embodiments have in common the ratchet teeth arranged one behind the other at equal distances in adjustment direction 120. The distance between two ratchet teeth is referred to as z, b is the width of a ratchet tooth. The number of ratchet teeth is referred to as n; in the first embodiment is n=3, in the second n=4.

Independent of the relative position between snap-in bar 122 and locking unit 130, both embodiments and, in principle, the locking device according to the invention maintain that at least one ratchet tooth under action of the springs 148 engages into a locking gap 126 or 128 to such extent that a first step of lock is achieved. As is apparent from FIGS. 4 to 6, the locking device has four pin-shaped ratchet teeth 132, 134, 136, 137 of circular cross-section. At their lower, free end they are designed in truncated cone shape. In this way, at both the left and right flanks (viewed in adjustment direction 120), a partial area 144 is formed which then continues upwards in an area 146 extending in locking direction 140. The drag clutch of the operating device and the springs are not shown for locking unit 130 according to FIG. 5; however, they are designed as in the first embodiment or in another type familiar to the artisan.

In the second embodiment the short locking gaps 126 are of circular shape, and the circle radius is r. The long locking gaps are slots limited by two half-circle arcs of radius r, and their overall length is 4r. Hence, they are twice as long (viewed in adjustment direction 120) as the short locking gaps 126. The lockings 24 have a length of r. Thus, the periodic measure P=9r. Therefore, the two lockings 124 make up for 2/9 of the periodic measure P.

The pin-shaped ratchet teeth 132, 134, 136, 137 of the same construction have a diameter of 1.2r and thus, 60% of the diameter of a circular short locking gap 126. Their clearance z is smaller than the width of a locking 124. However, in the region of their tips where the partial areas 144 take effect, the clearance between the ratchet teeth is larger than the width of a locking 124. This can be inferred from the slack-free lock according to FIG. 6; therein, the two left ratchet teeth 132, 134 are responsible for slack-free lock. Among them the left ratchet tooth 132 has advanced completely in locking direction 140 while the second ratchet tooth 134 has engaged only in part; with its left partial area 144 it contacts the adjacent locking 124 and thus, provides absence of slack. The third ratchet tooth 136 as viewed from the left comes to lie on a locking 124 while the fourth ratchet tooth 137 has engaged freely into a long locking gap 128 without any contact. The width of the locking unit 130 as measured over the total four ratchet teeth 132, 134, 136, 137 is n×b+(n−1)×z. This measure is about 80% of P.

We claim:

1. A locking device for an adjustable vehicle seat, having a snap-in bar extending parallel to an adjustment direction, which snap-in bar has lockings and locking gaps arranged in a periodic measure P, and having a locking unit pertaining to said snap-in bar and shiftable in the adjustment direction along said snap-in bar, which locking unit has more than two ratchet teeth, which are independently movable in a locking direction extending across the snap-in bar, and elastically preloaded in the locking direction by a biasing means, are disengaged simultaneously by bias operating means are arranged one behind the other at equal distance in the adjustment direction, are of the same construction, each have two lateral flanks designated to be contacted with the lockings, with at least one of the two lateral flanks having a partial area located at the front in locking direction, which extends at an acute angle to the locking direction, so that one of said at least two ratchet teeth cannot be pushed out of its locking position in a locking gap when the vehicle seat is exposed to force in adjustment direction due to an accident, characterized in that for each periodic measure P, there is provided a short locking gap, a first locking, a long locking gap, and a second locking corresponding in width to the first locking, with the long locking gap being at least 1.5 times as wide as the short locking gap, and with the first and the second lockings together making up for less than 40% of the periodic measure P.

2. The locking device according to claim 1, wherein z is the distance between two ratchet teeth and b is the width of a ratchet tooth characterized in that the long locking gap is larger than the sum of the distance z between two ratchet teeth of the more two ratchet teeth and the width b of said two ratchet teeth, hence, is larger than z+2b.

3. The locking device according to claim 1, wherein b is the width of a ratchet tooth, characterized in that the short locking gap is larger than the width b of a ratchet tooth of the more than two ratchet teeth.

4. The locking device according to claim 1, characterized in that the long locking gap is not smaller than double the width of the small locking gap.

5. The locking device according to claim 1, characterized in that the ratchet teeth have a tooth tip, that the distance between two adjacent ratchet teeth of the more than two ratchet teeth in the region of their tooth tips is larger than the width of a locking and that the distance between the two adjacent ratchet teeth in the region above the partial area is smaller than the width of a locking.

6. The locking device according to claim 1, characterized in that the width of a locking is not larger than 12% of the periodic measure P.

7. The locking device according to claim 1, characterized in that each short locking gap has the shape of a circle, which circle has a radius, the radius being r, that the long locking gaps are slots limited by half-circular arcs of radius r and that ratchet teeth are round and have a radius s, with the radius s being smaller than the radius 4.

8. The locking device according to claim 7, characterized in that the ratchet teeth for forming the partial area have one of cone-shaped tips and truncated cone shaped tips.

9. The locking device according to claim 1, characterized in that the locking unit has more than three ratchet teeth.

10. The locking device according to claim 1, characterized in that the locking device has n ratchet teeth, that each ratchet tooth has a width b, and that $n*b+(n-1)*z$ is smaller than the periodic measure P, whereby z is the distance between two adjacent ratchet teeth.

11. The locking device according to claim 1, characterized in that the partial area is a slanted extending partial area and in that a drag clutch having a clear drag path is provided for simultaneous disengagement of the ratchet teeth, whereby the clear drag path of all ratchet teeth is longer than the length of the slanted extending partial area.

12. The locking device according to claim 1, characterized in that the first and the second lockings together make up for less than 25% of the periodic measure P.

13. The locking device according to claim 1, characterized in that the short locking gap is smaller than double the width of a ratchet tooth of the more than two ratchet teeth.

14. The locking device according to claim 1, characterized in that the long locking gap has a width twice as large as the width of the short locking gap.

15. The locking device according to claim 6, characterized in that the width of a locking is not larger than 10% of the periodic measure P.

16. The locking device according to claim 7, characterized in that the radius s is smaller than 70% of the radius r.

17. The locking device according to claim 16, characterized in that the radius s is smaller than 60% of the radius r.

18. The locking device according to claim 1, wherein said adjustable vehicle seat is shiftable in longitudinal direction.

19. The locking device according to claim 1, characterized in that the locking unit has four ratchet teeth (32–37).

* * * * *